US012621226B2

(12) United States Patent (10) Patent No.: US 12,621,226 B2
Ding et al. (45) Date of Patent: May 5, 2026

(54) ESTIMATING NETWORK PERFORMANCE BASED ON APPLICATION SYNCHRONIZATION SIGNALS

(71) Applicant: AT&T Intellectual Property I, L.P., Atlanta, GA (US)

(72) Inventors: Yuan Ding, Plainsboro, NJ (US); Vinay Sharma, Queens Village, NY (US); Natalia Schenck, Dallas, TX (US); Tzvi Chumash, Matawan, NJ (US); Joseph Dahan, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 18/762,471

(22) Filed: Jul. 2, 2024

(65) Prior Publication Data

US 2026/0012404 A1 Jan. 8, 2026

(51) Int. Cl.
H04L 43/04 (2022.01)
H04L 43/08 (2022.01)
(52) U.S. Cl.
CPC ............. H04L 43/04 (2013.01); H04L 43/08 (2013.01)

(58) Field of Classification Search
CPC .... H04J 3/0632; H04L 43/10; H04L 41/5025; H04L 43/087; H04W 56/001
See application file for complete search history.

(56) References Cited

U.S. PATENT DOCUMENTS

| 2017/0371720 A1* | 12/2017 | Basu | G06F 9/4881 |
| 2020/0019208 A1* | 1/2020 | You | H04L 7/02 |
| 2024/0017056 A1* | 1/2024 | Tellenbach | G16H 20/30 |
| 2024/0323834 A1* | 9/2024 | Cariou | H04W 52/0206 |

* cited by examiner

*Primary Examiner* — Chirag R Patel

(57) ABSTRACT

A method performed by a processing system including at least one processor includes monitoring, over a defined period of time, a plurality of application synchronization signals exchanged between an application server and a user endpoint device in a communications network, measuring, for each application synchronization signal of the plurality of application synchronization signals, a value of a network performance metric, to produce a plurality of network performance metric values, plotting a distribution of the plurality of network performance metric values, calculating a percentage of the plurality of network performance metric values for which the value of the network performance metric fails to meet a threshold that is defined relative to the distribution, and classifying a performance of the communications network from a perspective of the user endpoint device, based on the percentage.

20 Claims, 3 Drawing Sheets

200

300

ESTIMATING NETWORK PERFORMANCE BASED ON APPLICATION SYNCHRONIZATION SIGNALS

The present disclosure relates generally to communications networks and relates more particularly to devices, non-transitory computer-readable media, and methods for estimating network performance based on application synchronization signals.

BACKGROUND

Internet service providers are constantly monitoring network performance to ensure that the quality of service experienced by customers meets a promised or expected quality of service. Many existing methods of monitoring network service rely on the measurement of one or more network metrics, such as bandwidth usage, latency, packet loss, jitter, or the like.

SUMMARY

In one example, the present disclosure describes a device, computer-readable medium, and method for estimating network performance based on application synchronization signals. For instance, in one example, a method performed by a processing system including at least one processor includes monitoring, over a defined period of time, a plurality of application synchronization signals exchanged between an application server and a user endpoint device in a communications network, measuring, for each application synchronization signal of the plurality of application synchronization signals, a value of a network performance metric, to produce a plurality of network performance metric values, plotting a distribution of the plurality of network performance metric values, calculating a percentage of the plurality of network performance metric values for which the value of the network performance metric fails to meet a threshold that is defined relative to the distribution, and classifying a performance of the communications network from a perspective of the user endpoint device, based on the percentage.

In another example, a non-transitory computer-readable medium stores instructions which, when executed by a processor, cause the processor to perform operations. The operations include monitoring, over a defined period of time, a plurality of application synchronization signals exchanged between an application server and a user endpoint device in a communications network, measuring, for each application synchronization signal of the plurality of application synchronization signals, a value of a network performance metric, to produce a plurality of network performance metric values, plotting a distribution of the plurality of network performance metric values, calculating a percentage of the plurality of network performance metric values for which the value of the network performance metric fails to meet a threshold that is defined relative to the distribution, and classifying a performance of the communications network from a perspective of the user endpoint device, based on the percentage.

In another example, a device includes a processor and a computer-readable medium storing instructions which, when executed by the processor, cause the processor to perform operations. The operations include monitoring, over a defined period of time, a plurality of application synchronization signals exchanged between an application server and a user endpoint device in a communications network, measuring, for each application synchronization signal of the plurality of application synchronization signals, a value of a network performance metric, to produce a plurality of network performance metric values, plotting a distribution of the plurality of network performance metric values, calculating a percentage of the plurality of network performance metric values for which the value of the network performance metric fails to meet a threshold that is defined relative to the distribution, and classifying a performance of the communications network from a perspective of the user endpoint device, based on the percentage.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
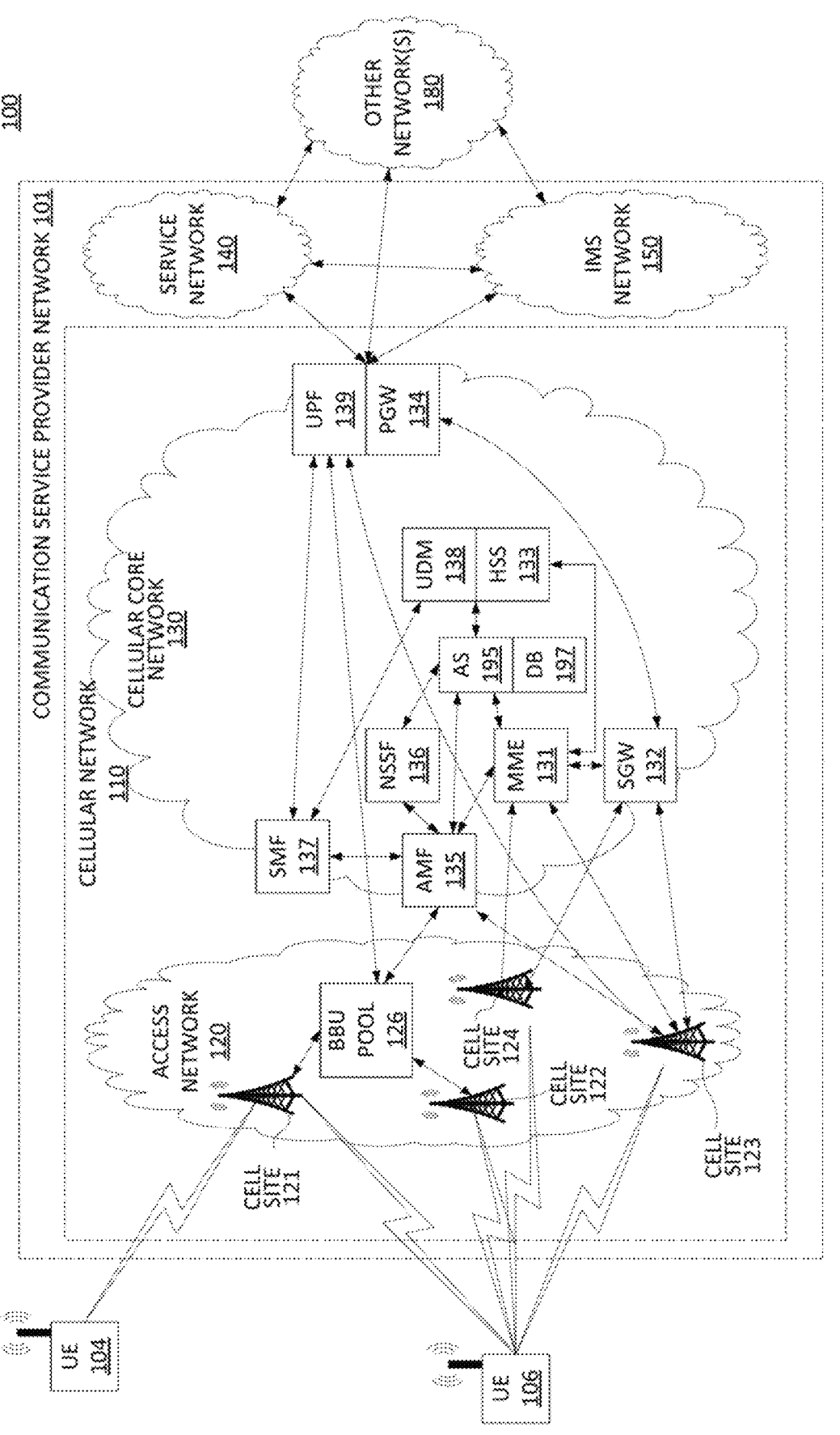
FIG. 1 illustrates an example network, or system, in which examples of the present disclosure may operate.

In one example, the present disclosure estimates network performance based on application synchronization signals. As discussed above, Internet service providers are constantly monitoring network performance to ensure that the quality of service experienced by customers meets a promised or expected quality of service. Many existing methods of monitoring network service rely on the measurement of one or more network metrics, such as bandwidth usage, latency, packet loss, jitter, or the like. However, while these network metrics can provide a generalized overview of network performance, network performance estimates derived from these metrics do not typically accurately reflect the quality of network performance actually experienced by individual customers or specific applications. As such, some customers and applications may still experience poor quality of service. While other methods, such as deep packet inspection (DPI), can provide greater insight from the customer or application perspective, DPI is of limited use when network traffic is encrypted, which is becoming increasingly common.

Examples of the present disclosure provide an approach that estimates network performance from the customer or application perspective based on application synchronization signals. Within the context of the present disclosure, application synchronization signals are understood to include short, fast data flows exchanged between application servers and user endpoint devices (which may be server-triggered or user endpoint-triggered) for the purposes of synchronizing the application servers with the user endpoint devices. For instance, a streaming media application executing on a user endpoint device may periodically synchronize itself with the application server that supports the streaming media application to make sure the media continues to stream to the user endpoint device at a desired bitrate. A Voice over Internet Protocol (VoIP) call may periodically exchange "heartbeat" signals with a VoIP server to continue a VoIP session and to ensure the session is being provided with the proper data resolution. A gaming server may periodically send and/or receives signals to and/or from all players' user endpoint to ensure that the user endpoint devices are synchronized to the gaming server at the millisecond level, which allows for alignment of game content across the user endpoint devices. A notification server may periodically send synchronization signals to a user endpoint device to ensure timely delivery of notifications to the user endpoint device.

In one example, a network performance metric, such as latency, may be measured for a plurality of application synchronization signals of a network traffic flow (i.e., a sequence of data packets being exchanged between the same source and destination) being exchanged between a user endpoint device and a server. For instance, examples of the invention may measure the length of time it takes each synchronization signal of the flow to travel from its source to its destination over a defined period of time. A distribution of the measured length of time may be plotted over all of the synchronization signals that occurred during the defined period of time. A threshold may be defined relative to the distribution. The percentage of the total number of flows for which the length of time fails to meet (e.g., is greater than or less than, depending on the metric) the threshold may be calculated, and the percentage may be used to classify the network performance experienced by the user endpoint device. If the classification of the network performance fails to at least match a desired classification, then actions may be taken to improve the network performance, e.g., increasing network resources to increase bandwidth, to increase processing capability, to reduce latency, etc.

Advantages of the present disclosure include the ability to estimate network performance from a customer or application perspective, rather than from the network perspective. This allows poor network performance to be quickly detected and remediated, thereby reducing the impact of the poor network performance on customers. This also allows an ISP to detect when poor network performance may be disproportionately affecting specific customers or applications. Moreover, because the disclosed approach does not require knowledge of the contents of network traffic flows, the approach can work even when the network traffic is encrypted. These and other aspects of the present disclosure are discussed in greater detail in connection with FIGS. 1-3, below.

FIG. 1 illustrates an example network, or system, 100 in which examples of the present disclosure may operate. In one example, the system 100 includes a communication service provider network 101. The communication service provider network 101 may comprise a cellular network 110 (e.g., a 5G network, a 4G/Long Term Evolution (LTE)/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a radio access network (RAN), such as a cloud RAN, a distributed RAN (D-RAN), a centralized RAN (C-RAN), a virtualized RAN (V-RAN), or an open RAN (O-RAN). For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs) or radio units (RUs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as MIMO antennas, and millimeter wave antennas.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In one example, baseband unit functionality may be split into a centralized unit (CU) and a distributed unit (DU). In addition, the CU and the DU may be physically separate from one another. For instance, a DU may be situated with an RU/RRH at a cell site, while a CU may be in a centralized location hosting multiple CUs. Alternatively, or in addition, a single CU may serve multiple DUs and/or RUs/RRHs. In accordance with the present disclosure a "base station" may therefore comprise at least a BBU (e.g., in one example, a CU and/or a DU), and may further include at least one RRH/RU.

In another example, the access network 120 may comprise an O-RAN, and examples of the present disclosure for estimating network performance based on application synchronization signals may be deployed as an xApp in a RAN intelligent controller (RIC) of the O-RAN (i.e., a software tool used by the RIC to manage network functions in near-real time), close to a new radio (NR) component of the O-RAN.

Figure 3:
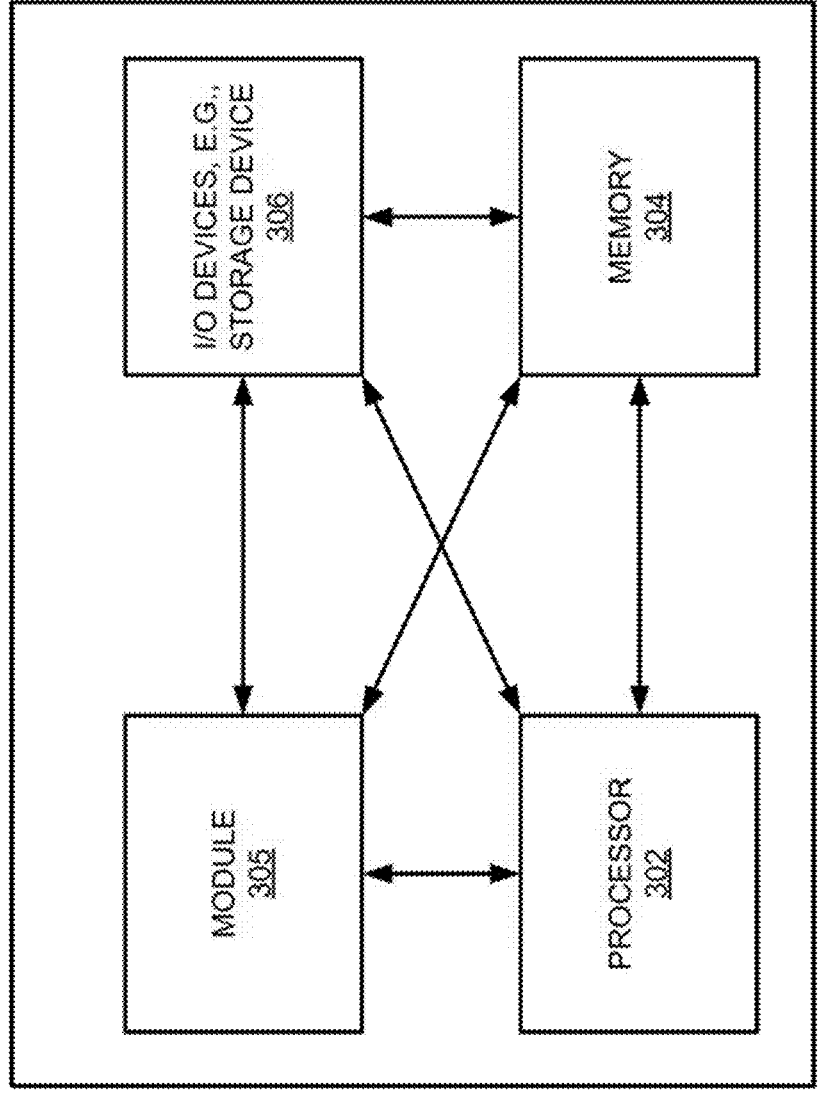
FIG. 3 depicts a high-level block diagram of a computing device specifically programmed to perform the functions described herein.

In accordance with the present disclosure, any one or more of cell sites 121-123 may be deployed with antenna and radio infrastructures, including MIMO and millimeter wave antennas. Furthermore, in accordance with the present disclosure, a base station (e.g., cell sites 121-123 and/or baseband units within BBU pool 126) may comprise all or a portion of a computing system, such as computing system 300 as depicted in FIG. 3, and may be configured to perform steps, functions, and/or operations in connection with examples of the present disclosure for estimating network performance based on application synchronization signals.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network nodes such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 5G network components, 3G network components, etc. Thus, cellular core network 130 may comprise an integrated network, e.g., including any two or more of 2G-5G infrastructures and technologies (or any future infrastructures and technologies to be deployed, e.g., 6G), and the like. For example, as illustrated in FIG. 1, cellular core network 130 further comprises 5G components, including: an access and mobility management function (AMF) 135, a network slice selection function (NSSF) 136, a session management function (SMF) 137, a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QOS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., a "5GC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and/or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1. It should be noted that intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. Each of the UEs 104 and 106 may comprise a cellular telephone, a smartphone, a tablet computing device, a laptop computer, a pair of computing glasses, a wireless enabled wristwatch, a wireless transceiver for a fixed wireless broadband (FWB) deployment, an item of customer premises equipment, or any other cellular-capable mobile telephony and computing device (broadly, "an endpoint device"). For instance, each of the UEs 104 and 106 may include one or more radio frequency (RF) transceivers for cellular communications and/or for non-cellular wireless communications. In one example, each of the UEs 104 and 106 may be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive and/or to transmit multi-path and/or spatial diversity signals.

In one example, each of the UEs 104 and 106 may comprise all or a portion of a computing system, such as computing system 300 depicted in FIG. 3, and may be configured to perform steps, functions, and/or operations in connection with examples of the present disclosure for estimating network performance based on application synchronization signals. In this regard, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As illustrated in FIG. 1, UE 104 may access wireless services via the cell site 121 (e.g., NR alone, where cell site 121 comprises a gNB), while UE 106 may access wireless services via any of the cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via one or multiple gNBs (e.g., cell sites 121 and 122 and/or cell sites 121 and 122 in conjunction with BBU pool 126 and/or various other components, such as a CU and/or a DU). In another example, UE 106 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for carrier aggregation and/or dual connectivity. Similarly, UE 106 may communicate with any of the cell sites 121 and 122 using carrier aggregation (CA) (e.g., in accordance with a CA technique). Furthermore, either or both of NR/5G and or EPC (4G/LTE) core network components may manage the communications between UE 106 and the cellular network 110 via cell site 122 and cell site 124.

In one example, the cellular core network 130 may further include an application server (AS) 195, which may comprise a computing system or server, such as computing system 300 depicted in FIG. 3, and may be configured to provide one or more operations or functions in connection with examples of the present disclosure for estimating network performance based on application synchronization signals. The cellular core network 130 may also include a database (DB) 197 that is communicatively coupled to the AS 195.

The AS 195 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 195 may be configured to estimate network performance from the perspective of a specific UE 104 or 106 or a specific application executing on a UE 104 or 106 based on application synchronization signals. For instance, in some examples, the AS 195 may intercept and analyze application synchronization signals exchanged between a UE 104 or 106 and another application server in the cellular core network 130, the service network 140, the IMS network 150, or other networks 180. The AS 195 may further calculate a percentage of the application synchronization signals, exchanged over a period of time, for which a measured network performance metric value failed to meet a predefined threshold (e.g., a latency that is more than twice the standard deviation of the latency measured over the period of time). The AS 195 may classify the quality of the network performance experienced by the UE 104 or 106 or by an application executing on the UE 104 or 106 based on this percentage. If the classification indicates that the quality of the network performance experienced by the UE 104 or 106 or by the application executing on the UE 104 or 106 is poor or unacceptable, then the AS 195 may initiate an action to improve the quality of the network performance experienced by the UE 104 or 106 or by the application executing on the UE 104 or 106. For instance, the AS 195 may send signals to network elements within the cellular core network 130 or access network 120 to move the UE 104 or 106 to a new network slice, to prioritize routing of data packets associated with an application executing on the UE 104 or 106, or to begin a network optimization routine.

The DB 197 may store information about classes of network performance quality into which network performance may be classified (e.g., percentage ranges or thresholds). The DB 197 may also store rules that specify actions to be taken when the network performance quality from the perspective of a specific UE 104 or 106 or specific application is classified into one of the classes (e.g., if classified into a first class, do nothing; if classified into a second class, continue to monitor; if classified into a third class, move the UE 104 or 106 to a new network slice; etc.).

In one example, the DB 197 may comprise a physical storage device integrated with the AS 195 (e.g., a database server or a file server), or attached or coupled to the AS 195, in accordance with the present disclosure. In one example, the AS 195 may load instructions into a memory, or one or more distributed memory units, and execute the instructions for estimating network performance based on application synchronization signals, as described herein. An example method for estimating network performance based on application synchronization signals is described in greater detail below in connection with FIG. 2.

In one example, the cellular core network 130 may include multiple instances of the AS 195 and DB 197 distributed throughout the cellular core network 130, where the multiple instances each store identical data for the purposes of redundancy.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of the cell sites 121-123 may comprise 2G, 3G, 4G and/or LTE radios, e.g., in addition to 5G new radio (NR), or gNB functionality, or any future cellular technology, e.g., 6G and so on. For instance, cell site 123 is illustrated as being in communication with AMF 135 in addition to MME 131 and SGW 132. Thus, these and other modifications are all contemplated within the scope of the present disclosure.

Figure 2:
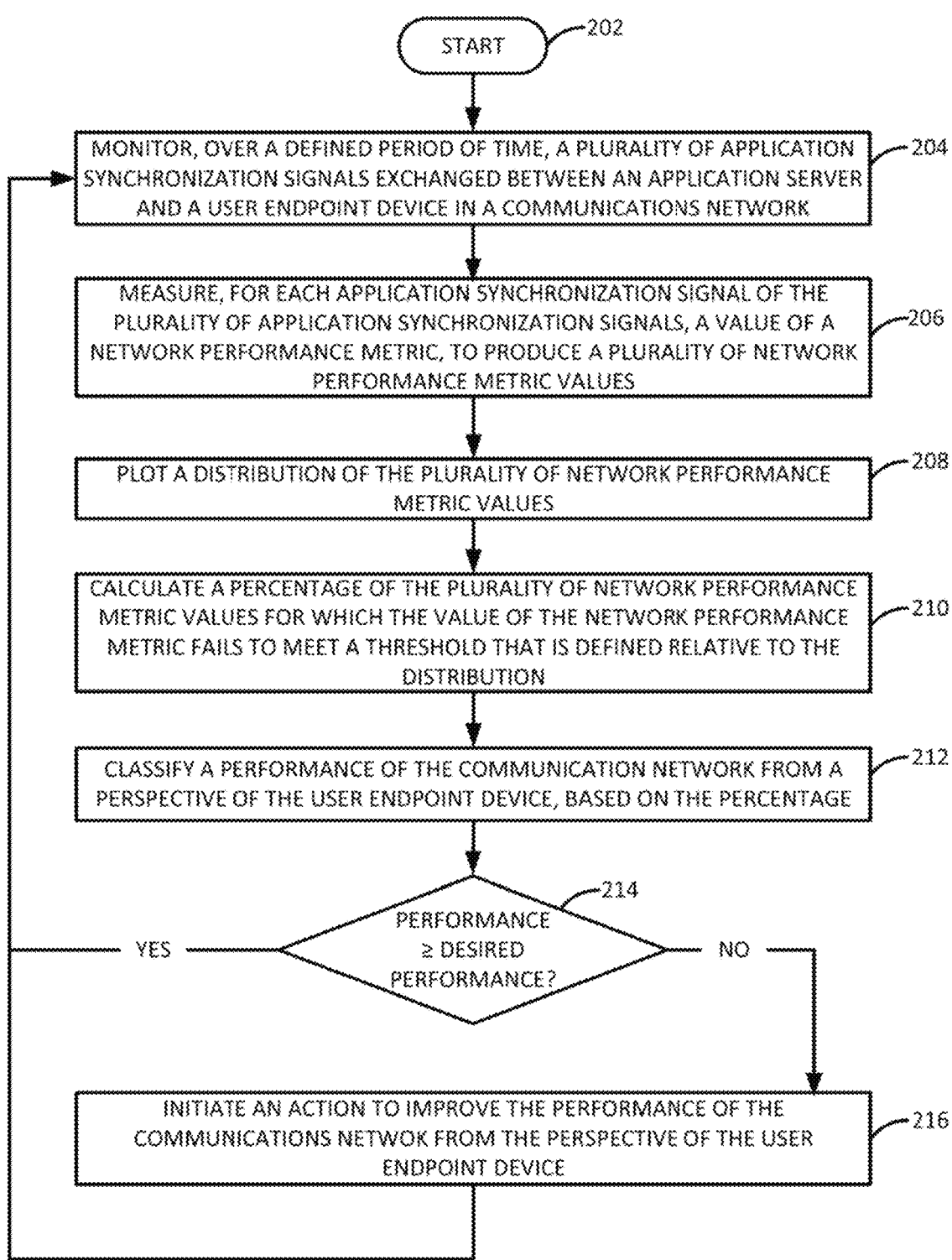
FIG. 2 illustrates a flowchart of an example method for estimating network performance based on application synchronization signals, in accordance with the present disclosure.

To further aid in understanding the present disclosure, FIG. 2 illustrates a flowchart of an example method 200 for estimating network performance based on application synchronization signals, in accordance with the present disclosure. In one example, the method 200 may be performed by a cell site or an application server that is configured to monitor application synchronization signals exchanged between user endpoint devices and other application servers, such as the AS 195 or cell sites 121-123 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may monitor, over a defined period of time, a plurality of application synchronization signals exchanged between an application server and a user endpoint device in a communications network.

As discussed above, when a user endpoint device is connected to an application server for the purposes of utilizing an application or service hosted by the application server, the user endpoint device and the application server may exchange periodic synchronization signals (such as pings or heartbeats) to ensure that the user endpoint device's utilization of the application or service continues in a consistent and uninterrupted manner. These application synchronization signals typically comprise short, fast (e.g., millisecond level) exchanges of data packets that carry only a few bytes' worth of information (such as the bandwidth available to the user endpoint device, a selected bitrate at which the user endpoint device wishes to stream video from the application server, a ping to verify that the user endpoint device is still connected to the application server, or the like). The application synchronization signals may be triggered by the user endpoint device (e.g., the user endpoint device provides its available bandwidth to an application server that streams video for the purposes of determining what bitrates the user endpoint device can support) or triggered by the application server (e.g., the application server asks the user endpoint device to respond to a ping to confirm that the user endpoint device is still connected to the application server and that an ongoing session should be continued).

For instance, a streaming media application executing on the user endpoint device may periodically synchronize itself with the application server that supports the streaming media application to make sure the media continues to stream to the user endpoint device at a desired bitrate. A Voice over Internet Protocol (VoIP) call may periodically exchange "heartbeat" signals with a VoIP server to continue a VoIP session and to ensure the session is being provided with the proper data resolution. A gaming server may periodically send and/or receives signals to and/or from all players' user endpoint to ensure that the user endpoint devices are synchronized to the gaming server at the millisecond level, which allows for alignment of game content across the user endpoint devices. A notification server may periodically send synchronization signals to a user endpoint device to ensure timely delivery of notifications to the user endpoint device.

In one example, the processing system is part of a computing device or server that is separate from both the user endpoint device and the application server. For instance, the computing device or server of which the processing system is a part may be deployed by an ISP that operates the communications network to estimate the performance of the communications network from the perspective of the various user endpoint devices that subscribe to the ISP's services.

In step 206, the processing system may measure, for each application synchronization signal of the plurality of application synchronization signals, a value of a network performance metric, to produce a plurality of network performance metric values. In one example, the network performance metric may be one or more of: bandwidth usage, latency, packet loss, jitter, or another metric. The measurement of the network performance metric may depend on the type of the communications network. For instance, in a mobility network, the performance of the RAN may differ from the performance of the core network (e.g., the latency of the RAN may be greater than the latency of the core network, or vice versa).

In step 208, the processing system may plot a distribution of the plurality of network performance metric values. In one example, the distribution is a Gaussian distribution. However, in other examples, the distribution may be another type of distribution (e.g., a non-Gaussian distribution). The purpose of the distribution is to help separate examples of "good" or acceptable network performance from examples of "bad" or unacceptable network performance.

In step 210, the processing system may calculate a percentage of the plurality of network performance metric values for which the value of the network performance metric fails to meet a threshold that is defined relative to the distribution. As discussed above, the purpose of the distribution is to help separate examples of "good" or acceptable network performance from examples of "bad" or unacceptable network performance. The threshold may define the cutoff between the "good" and "bad" network performance. In one example, the threshold may be defined relative to the standard deviation of the distribution. For instance, in one example, the threshold is twice the standard deviation. Thus, in this example, any network performance metric values that are lower than or equal to twice the standard deviation of the distribution may be considered "good" or "acceptable," while any network performance metric values that are higher than twice the standard deviation may be considered "bad" or "unacceptable." It should also be noted that in one embodiment, there may be additional performance metric granularities based on a plurality of thresholds, e.g., representing "very good," "good," "acceptable," "bad," and "very bad," etc.

It should be noted that "good" and "bad" network performance metric values may be determined in other ways as well, such as by using a machine learning model (e.g., XGBoost) that is trained to classify the network performance metric values.

Once the processing system has determined which network performance metric values of the plurality of network performance metric values meet the threshold and which do not, the processing system may calculate the percentage. In one example, the percentage may be calculated as:

$$P = \frac{\sum_{N} B * W}{\sum_{N} B * W + \sum_{N} G * W}$$

where P is the percentage of the plurality of network performance metric values for which the value of the network performance metric fails to meet the threshold, $\Sigma_N$ B is the number of values of the plurality of network performance metric values that fail to meet the threshold, and $\Sigma_N$ G is the number of values of the plurality of network performance metric values that meet the threshold.

In step 212, the processing system may classify a performance of the communications network from a perspective of the user endpoint device, based on the percentage. In one example, a plurality of (e.g., two or more) classes may be predefined to correspond to specific percentage ranges. In one specific example, for instance, three classes may be determined: any percentage below a first threshold percentage (e.g., thirty percent) may be classified as good or acceptable network performance; any percentage above the first threshold percentage but below a second threshold percentage (e.g., thirty-one to sixty percent) may be classified as satisfactory network performance; and any percentage above the second threshold percentage (e.g., sixty-one percent or more) may be classified as poor or unacceptable network performance.

It will be appreciated that any number of classes may be used to classify the percentage in terms of quality of network performance. For instance, in one example, the classification could be a simple binary good/bad classification. In another example, the classification could classify the percentage into one of three or more classes, where each class of the three or more classes may be associated with a different rule or remedial action that should be taken. The rule or remedial actions may become more drastic as the quality of the network performance decreases.

In step 214, the processing system may determine whether the performance of the communications network from the perspective of the user endpoint device is at least equal to a desired level of performance. If the processing system concludes in step 214 that the performance of the communications network from the perspective of the user endpoint device is at least equal to a desired level of performance, then the method 200 may return to step 204, and the processing system may proceed as described above to monitor, over a subsequent defined period of time, a plurality of application synchronization signals exchanged between the application server and the user endpoint device.

If, however, the processing system concludes in step 214 that the performance of the communications network from the perspective of the user endpoint device is not at least equal to a desired level of performance, then the method 200 may proceed to step 216. In step 216, the processing system may initiate an action to improve the performance of the communications network from the perspective of the user endpoint device.

In one example, the action may comprise performing a network optimization routine to ensure optimal allocation of network resources across the communications network. In another example, the action may comprise allocating, activating, and/or reconfiguring existing or newly activated network resources, e.g., creating or moving the user endpoint device to a dedicated network slice that will provide improved network performance for the user endpoint device. In another example, the action may comprise triggering a network data analytics function (NWDAF) to prioritize network traffic associated with the user endpoint device.

Once the action to improve the performance of the communications network has been initiated, the method 200 may return to step 204, and the processing system may proceed as described above to monitor, over a subsequent defined period of time, a plurality of application synchronization signals exchanged between the application server and the user endpoint device.

Thus, by examining network performance metrics associated with application synchronization signals, examples of the present disclosure can more accurately estimate the network performance from the perspective of specific customers or applications, even when all or some of the network traffic associated with those specific customers or applications is encrypted. This allows an ISP to more quickly detect performance issues that might be missed by more traditional methods for monitoring network performance. The disclosed approach also provides greater insight into the network performance requirements for different applications, which may vary from application to application. This insight may allow an ISP to allocate network resources among applications in a more optimal manner.

Beyond ISPs, other entities in the telecommunications industry, including mobile network operators, cloud service providers, large enterprises, network equipment manufacturers, regulatory bodies, and the like, may also benefit from the disclosed approach. For instance, as mobile network operators roll out 5G and Beyond 5G technologies, the ability to monitor application-specific network performance may become increasingly valuable. Companies that provide cloud-based services could use the disclosed approach to monitor the performance of their networks, ensuring high quality service for customers. Large organizations with complex internal networks could use the disclosed approach to monitor network performance, which will aid in network management and troubleshooting. Manufacturers of network equipment could integrate the disclosed approach into their products, thereby providing added value to customers. Regulator bodies could use the disclosed approach to monitor ISPs and ensure that the ISPs are providing satisfactory levels of service to their customers.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server (such as might be used to perform the method 200) could be implemented as illustrated in FIG. 3.

As depicted in FIG. 3, the system 300 comprises a hardware processor element 302, a memory 304, a module 305 for estimating network performance based on application synchronization signals, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for estimating network performance based on application synchronization signals may include circuitry and/or logic for analyzing application synchronization signals and deriving network performance metric measurements from the application synchronization signals which can be used to estimate network performance from the perspective of a specific customer or application. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for estimating network performance based on application synchronization signals (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for estimating network performance based on application synchronization signals (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
monitoring, by a processing system including at least one processor over a defined period of time, a plurality of application synchronization signals exchanged between an application server and a user endpoint device in a communications network;
measuring, by the processing system for each application synchronization signal of the plurality of application synchronization signals, a value of a network performance metric, to produce a plurality of network performance metric values;
plotting, by the processing system, a distribution of the plurality of network performance metric values;
calculating, by the processing system, a percentage of the plurality of network performance metric values for which the value of the network performance metric fails to meet a threshold that is defined relative to the distribution; and
classifying, by the processing system, a performance of the communications network from a perspective of the user endpoint device, based on the percentage.

2. The method of claim 1, wherein the plurality of application synchronization signals includes at least one of: a signal to synchronize a streaming media application executing on the user endpoint device with the application server that supports the streaming media application, a heartbeat signal exchanged between the user endpoint device with the application server that is a voice over internet protocol server, a signal to synchronize the user endpoint device with other endpoint devices connected to the application server that is a gaming server, or a signal to synchronize the user endpoint device with the application server that is a notification server.

3. The method of claim 1, wherein the processing system is part of a computing device that is separate from both the user endpoint device and the application server.

4. The method of claim 1, wherein the network performance metric comprises at least one of: a bandwidth usage metric, a latency metric, a packet loss metric, or a jitter metric.

5. The method of claim 1, wherein the distribution is a Gaussian distribution.

6. The method of claim 1, wherein the threshold is defined relative to a standard deviation of the distribution.

7. The method of claim 6, wherein the threshold is twice the standard deviation.

8. The method of claim 7, wherein any network performance metric values of the plurality of network performance metric values that are lower than or equal to the threshold represent instances of acceptable network performance while any network performance metric values of the plurality of network performance metric values that are higher than the threshold represent instances of unacceptable network performance.

9. The method of claim 1, wherein the classifying comprises assigning the performance of the communications network from a perspective of the user endpoint device to one class of a plurality of predefined classes, wherein each class of the plurality of predefined classes corresponds to a percentage range.

10. The method of claim 9, wherein a first percentage range comprises any percentage equal to or lower than a first threshold percentage.

11. The method of claim 10, wherein the performance of the communications network is classified as good when the percentage falls within the first percentage range.

12. The method of claim 10, wherein a second percentage range comprises any percentage above the first threshold percentage, but equal to or lower than a second threshold percentage.

13. The method of claim 12, wherein the performance of the communications network is classified as satisfactory when the percentage falls within the second percentage range.

14. The method of claim 12, wherein a third percentage range comprises any percentage above the second threshold percentage.

15. The method of claim 14, wherein the performance of the communications network is classified as poor when the percentage falls within the third percentage range.

16. The method of claim 1, further comprising:

determining, by the processing system, that the performance of the communications network from the perspective of the user endpoint device is not at least equal to a desired level of performance; and initiating, by the processing system, an action to improve the performance of the communications network from the perspective of the user endpoint device.

17. The method of claim 16, wherein the action comprises at least one of: performing a network optimization routine to ensure optimal allocation of network resources across the communications network, moving the user endpoint device to a dedicated network slice that will provide improved network performance for the user endpoint device, or triggering a network data analytics function to prioritize network traffic associated with the user endpoint device.

18. The method of claim 1, wherein the communications network comprises a mobility network.

19. A non-transitory computer-readable medium storing instructions which, when executed by a processing system including at least one processor, cause the processing system to perform operations, the operations comprising:

monitoring, over a defined period of time, a plurality of application synchronization signals exchanged between an application server and a user endpoint device in a communications network;

measuring, for each application synchronization signal of the plurality of application synchronization signals, a value of a network performance metric, to produce a plurality of network performance metric values;

plotting a distribution of the plurality of network performance metric values;

calculating a percentage of the plurality of network performance metric values for which the value of the network performance metric fails to meet a threshold that is defined relative to the distribution; and classifying a performance of the communications network from a perspective of the user endpoint device, based on the percentage.

20. A device comprising:

a processing system including at least one processor; and a computer-readable medium storing instructions which, when executed by the processing system, cause the processing system to perform operations, the operations comprising:

monitoring, over a defined period of time, a plurality of application synchronization signals exchanged between an application server and a user endpoint device in a communications network;

measuring, for each application synchronization signal of the plurality of application synchronization signals, a value of a network performance metric, to produce a plurality of network performance metric values;

plotting a distribution of the plurality of network performance metric values;

calculating a percentage of the plurality of network performance metric values for which the value of the network performance metric fails to meet a threshold that is defined relative to the distribution; and classifying a performance of the communications network from a perspective of the user endpoint device, based on the percentage.

* * * * *